Oct. 5, 1954   E. M. JOHNSON   2,690,851
BALE LOADER
Filed July 24, 1953   2 Sheets-Sheet 1

INVENTOR.
Emil M. Johnson
BY
McMorrow, Berman + Davidson
ATTORNEYS

Oct. 5, 1954
E. M. JOHNSON
2,690,851
BALE LOADER
Filed July 24, 1953
2 Sheets-Sheet 2
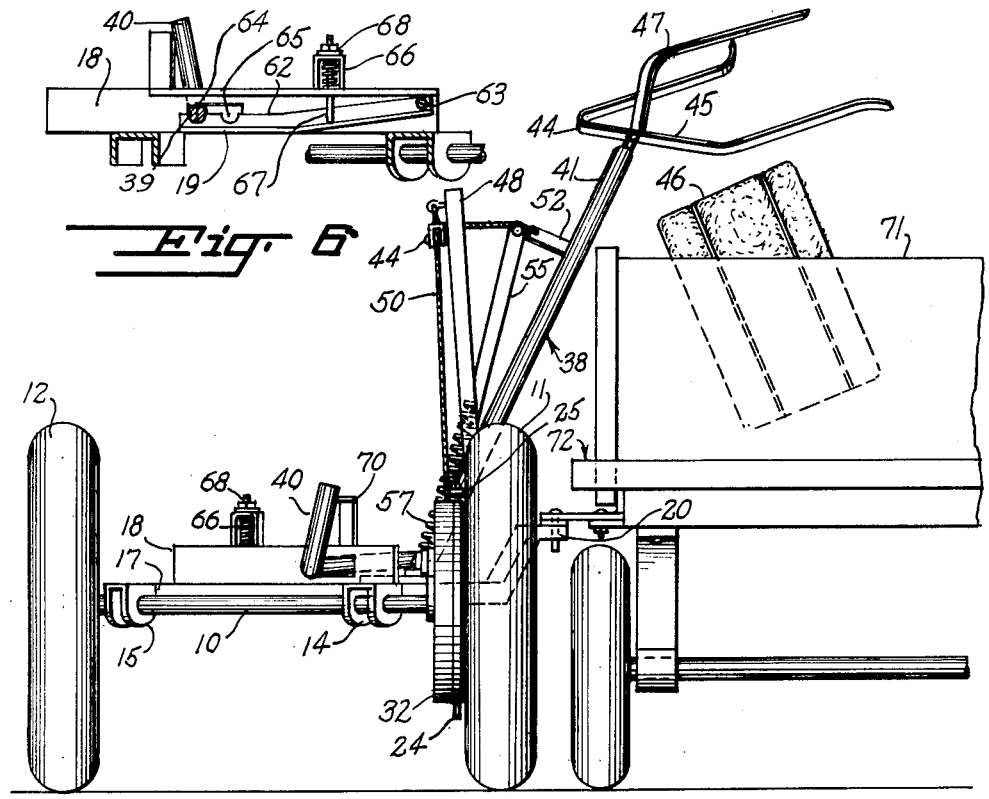
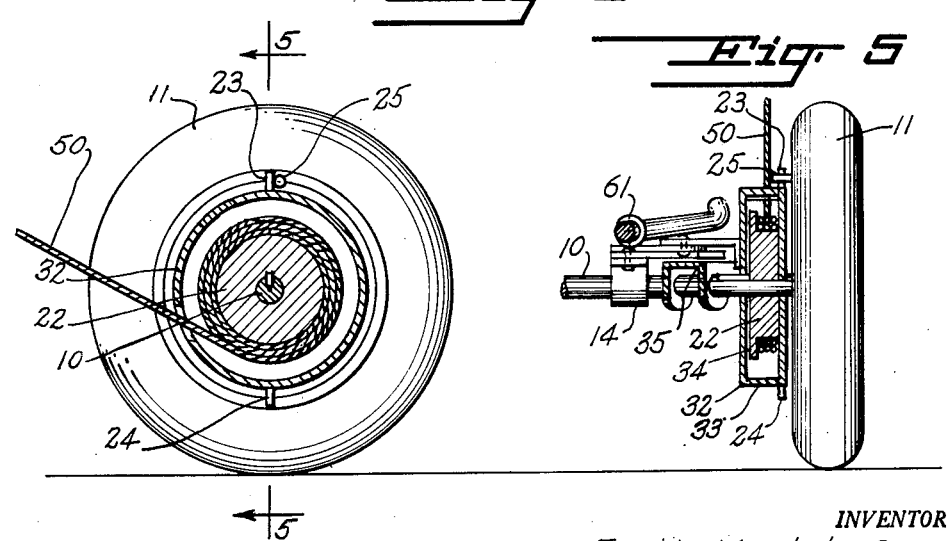
INVENTOR.
Emil M. Johnson
BY
McMorrow, Berman & Davidson
ATTORNEYS Patented Oct. 5, 1954

2,690,851

UNITED STATES PATENT OFFICE 2,690,851

BALE LOADER

Emil M. Johnson, Thomas, S. Dak.

Application July 24, 1953, Serial No. 370,011

3 Claims. (Cl. 214—359)

This invention relates to bale loaders and more particularly to a loading machine adapted to be hitched to a truck or wagon and to pick up bales from the ground and load them into the body of the associated truck or wagon.

It is among the objects of the invention to provide a bale loading machine which is wheel supported and can be hitched to a truck or wagon to run alongside the truck or wagon and lift bales from the ground into the truck or wagon body; which has a bale lifting fork disposed adjacent the front end of the associated vehicle and to one side thereof where the fork is in full view of the driver of the vehicle, the driver being thereby enabled to quickly and accurately engage the fork with bales scattered over the ground; which operates automatically when its fork engages a bale to lift the bale and deposit it in the body of the associated vehicle; which is powered by the forward movement of the associated vehicle and is protected from being damaged by its fork striking an obstruction, such as a rock or stump; and which is simple and durable in construction, economical to manufacture, easy to use, and effective and efficient in use.

Other objects and advantages will become apparent from a consideration of the following description and the appended claims in conjunction with the accompanying drawings, wherein:

Figure 3 is a rear elevational view of the bale loading machine and of an associated vehicle fragmentarily illustrated;

Figure 4 is a cross sectional view on the line 4—4 of Figure 2;

Figure 5 is a cross sectional view on the line 5—5 of Figure 4; and

Figure 6 is a cross sectional view on the line 6—6 of Figure 2.

Figure 1:
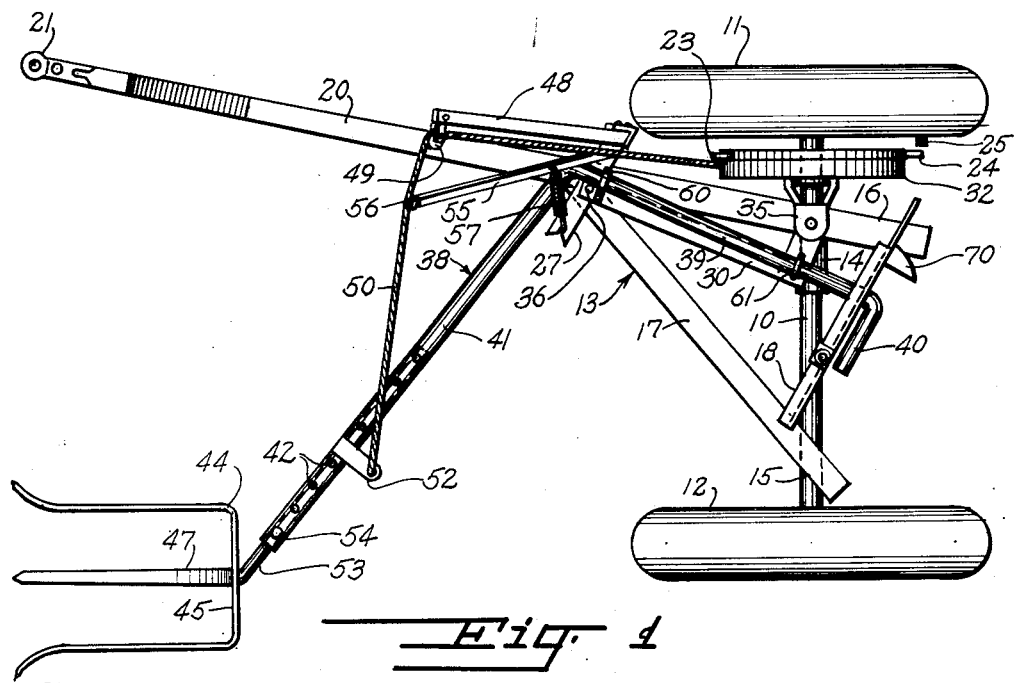
Figure 1 is a top plan view of a bale loading machine illustrative of the invention.

With continued reference to the drawings, the machine comprises an axle 10 with rubber tired wheels 11 and 12 secured one on each end of the axle and a frame 13 mounted on the axle and having bearing elements 14 and 15 secured thereto and receiving the axle near the wheels 11 and 12 respectively to journal the axle on the frame. The frame comprises a first elongated member 16 extending across the axle at an angle to the axle near the inner side of the wheel 11 and secured to the bearing 14 and a brace member 17 secured near one end to the bearing 15 and extending at an angle to the axle to the front end of the member 16 to which the brace member is joined at its forward end to provide a frame of substantially triangular shape. A cross member 18 extends across the space between the rear ends of the frame members 16 and 17 and is secured at one end to the member 17 a short distance forwardly of the bearing 15 and at its other end to the member 16 a short distance rearwardly of the bearing 14 so that the cross member 18 is also disposed at an angle to the axle 10. This cross member 18 is of right angular cross sectional shape and has a substantially horizontally disposed flange resting on the upper surfaces of the frame members 16 and 17 and a substantially vertically disposed flange projecting upwardly from the frame members, and provided intermediate its length with a longitudinally extending slot 19, the purpose of which will be later described.

A tongue 20 is joined at its rear end to the front end of the frame member 16 and extends forwardly from the frame in longitudinal alignment with the member 16, this tongue having on its front end an eye formation 21 to provide a hitch connection between the front end of the tongue and an associated vehicle at the front end of the body of the vehicle. It will be noted that a line passing through the eye formation 21 and disposed perpendicular to the longitudinal center line of the axle 10 will pass adjacent the outer side of the wheel 11 so that the bale loading machine, when hitched to an associated vehicle near the front end of the vehicle body, will run alongside the vehicle in spaced relationship thereto.

A cable drum 22 is journaled on the axle 10 adjacent the inner side of the wheel 11 and has at its side adjacent the wheel oppositely disposed lugs 23 and 24 projecting radially outwardly therefrom. A pin 25 projects from the inner side of the wheel 11 and is engageable with one or the other of the lugs 23 or 24 to rotate the drum when the drum is positioned adjacent the wheel, as illustrated in Figure 5. When the drum is moved to a second position spaced from the inner side of the wheel 11, the pin 25 passes the lugs 23 and 24 and the drum is not rotated by the wheel.

A flat bar 27 extends across and is secured to the machine frame at the juncture of the front ends of the frame members 13 and 16.

A flat lever 30 is pivotally mounted at one end on the bar 27 adjacent the front end of the frame member 17 and has its rear end disposed above the frame bearing 14. A shield 32 having a cylindrical side wall 33 and a flat end wall 34 encloses the cable drum 22 and has its flat end wall disposed against the end of the cable drum remote from the wheel 11. A link 35 is connected at one end to the end wall 34 of the shield 32 and is connected at its other end to the rear end of the lever 30 and is effective to move the drum 22 toward or away from the wheel 11 when the lever 30 is swung about its pivotal connection 36 with the frame 13, the lever 30 is thus constituting a clutch actuating lever for engaging and disengaging the clutch which controls the operation of the cable drum. The link 35 is preferably formed in separate longitudinally disposed parts pivotally connected at their joining ends to accommodate the arcuate movement of the connection between this link and the lever 30.

A crank shaped fork arm 38 of tubular construction has a straight portion 39 extending along the lever 30 and secured to the lever for rotational movement of this portion of the arm relative to the lever, one end of this arm portion 39 extending through the slot 19 in the cross member 18 of the frame and being provided with a perpendicularly offset terminal portion 40 at one end thereof. A second straight portion 41 of the arm extends from the other end of the portion 39 substantially perpendicular to the portion 39 outwardly from the tongue 20 from a location near the front end of the frame 13 past the plane of the wheel 12. This arm portion 41 is provided with a series of apertures 42 spaced apart longitudinally thereof.

A bale engaging fork 44 is mounted on the arm portion 41 at the distal end of this portion and includes a U-shaped member 45 of resilient material adapted to engage around the sides of a side bale 46, an L-shaped member 47 secured at one end to the intermediate portion of the member 45 medially of the length of this intermediate portion and extending medially between the legs of the U-shaped member and below the U-shaped member to engage under the bottom of the bale 46 disposed between the legs of the U-shaped member 45 to enable the fork to lift the associated bale.

A post 48 is mounted at one end on the end of the bar 27 nearest the wheel 11 and extends upwardly from the frame 13 and a cable sheave 49 is mounted on this post at the upper end thereof. A cable 50 is wound at one end on the cable drum 22, is carried over the sheave 49, and is connected at its other end to the fork arm 41 near the end of this arm on which the fork 44 is mounted by means of a bracket 52 secured to the portion 41 of the arm 38 and projecting laterally from this portion of the arm.

It will be noted that the fork includes a stem 53 extending from the intermediate portion 45 of the fork member 44 at an angle to this intermediate portion and received in the portion 41 of the arm 38. The stem 53 is provided with apertures spaced apart longitudinally thereof and a pin 54 extends through selected apertures in the arm portion 41 and in the fork stem 53 and secures the fork to the arm at selected positions of the stem 53 longitudinally of the portion 41 of the fork arm.

A lever 55 is pivotally mounted at one end on the bar 27 adjacent the end of the bar to which the post 48 is connected and this lever extends upwardly from the bar 27 and has its upper end engaged with the cable 50, as indicated at 56. A tension spring 57 is connected at one end to the end of the bar 27 remote from the post 48 and is connected at its other end to the lever 55 intermediate the length of this lever and is effective to resiliently pull the lever 55 downwardly for running the cable 50 backwardly from the drum 22 when the drum clutch has been released to lower the fork arm 38 and the fork 44.

Figure 2:
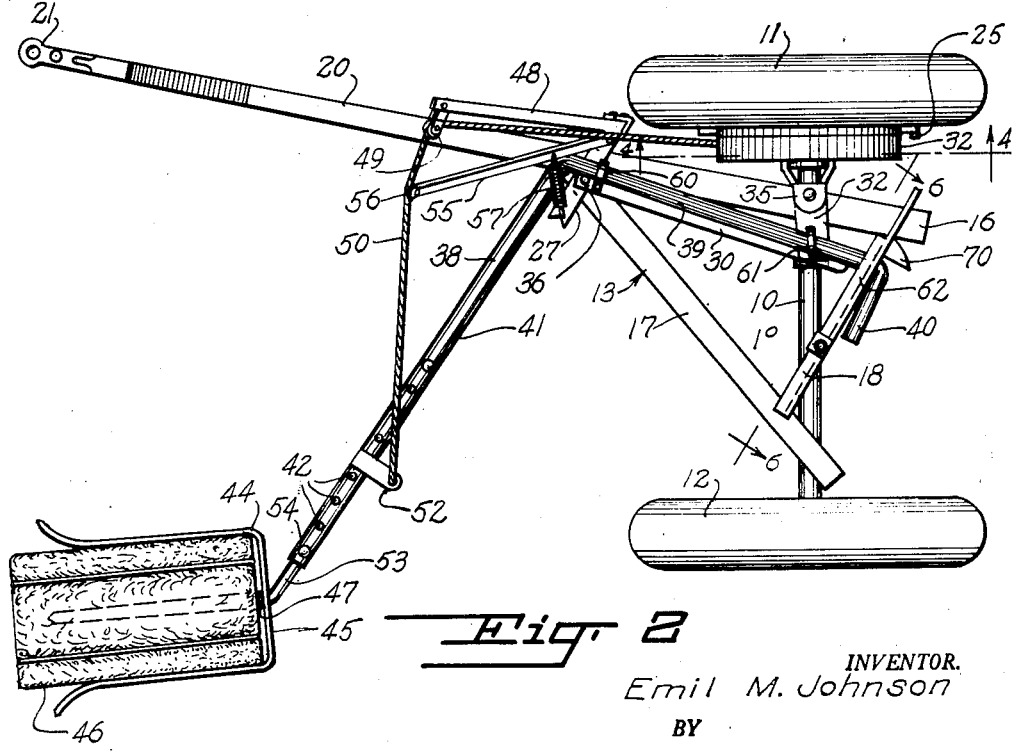
Figure 2 is a top plan view similar to Figure 1 but showing the machine in its bale lifting condition.

As explained above, when the fork 44 engages a bale 46, as illustrated in Figure 2, the force of this engagement urges the fork and the adjacent end of the fork arm rearwardly causing the clutch actuating lever 30 to swing about its pivotal connection 36 with the frame 13 toward the wheel 11 of the machine. The portion 39 of the fork arm is connected to the lever 30 for rotational movements relative to this lever by the bearing or staple connections 60 and 61 so that, while the fork arm can swing upwardly and downwardly relative to the lever 30, when the fork is forced rearwardly the lever is swung by the fork arm in the manner indicated, this movement of the lever 30 being transmitted through the pivoted linkage 35 to the drum housing 32 and forcing the drum 22 toward the wheel 11 until the pin 25 on the wheel engages with one of the lugs 23 or 24 on the cable drum, drivingly connecting the drum to the wheels of the machine so that the drum winds in the cable 50 and raises the outer end of the fork arm 38 and the fork 44.

When the lever 30 is swung toward the wheel 11 the rear end portion of the part 39 of the fork arm 38 is moved longitudinally of the slot 19 in the rear cross bar 18 toward the wheel 11 of the machine. A latch bar 62 is pivotally mounted at one end to the rear cross bar 18 at the end of this cross bar nearest the wheel 11 by a suitable rivet or bolt 63 and this latch bar is provided in its top edge and at the end thereof remote from the pivotal connection 63 with spaced apart notches 64 and 65 which releasably engage the rear end portion of the part 39 of the fork arm 38 to hold this part of the fork arm and the lever 30 in one or the other of two operative positions in one of which the clutch between the wheel 11 and the cable drum 22 is disengaged and in the other of which this clutch is engaged. The latch lever 62 is resiliently pulled upwardly against the portion of the fork arm extending through the slot 19 by a compression spring 66 mounted on the top surface of the latch lever 62 and connected by a pin 67 extending through the spring and carrying an abutment 68 at the top end of the spring to the rear cross bar 18, as illustrated in Figure 6.

An abutment 70 is mounted on the rear cross bar 18 near the end of this cross bar adjacent the wheel 11 and above the slot 19 and this abutment extends rearwardly from the rear cross bar.

When the cable 50 has been wound into an extent such that the part 41 of the fork arm has past by the post 48, as illustrated in Figure 3 and the fork 44 is disposed in inverted position above the bed 71 of the vehicle, generally indicated at 72, to which the bale loading machine is hitched, the angularly offset rear end portion 40 of the fork arm strikes the abutment 70, as is also illustrated in Figure 3, causing the part 39 of the fork arm and the clutch actuating lever 30 to swing about the pivotal connection 36 between the lever 30 and the frame 13 in a direction away from the wheel 11 of the loading machine. The rear end portion of the fork arm now moves out of the notch 65 in the latch plate 62 and into the notch 64 in this latch plate and, at the same time, the drum 22 is moved away from the wheel 11 freeing the pin 25 from the drum lug 23 or 24 with which the pin is engaged. This frees the drum 22 for rotation about the axle 10 and permits the cable 50 to run out and the fork arm 38 and fork 44 to descend from its raised position, as illustrated in Figure 3, to its lowered position, as illustrated in Figures 1 and 2, in which the fork rides on the ground. Since the fork arm is in an over center position past the post 48 when the cable drum is released, the tension spring 57, which is stressed at this time, is utilized to swing the fork arm back from its fully raised position, as illustrated in Figure 3, to a position from which it will descend by gravity until the fork comes into contact with the ground. As the fork arm was swung upwardly by the pull of the cable, the outer end of the bracket 52 engaged lever 55 at the end of this lever attached to cable 50 forcing lever 55 toward post 48 and placing spring 57 under tension. When cable 50 is released the stretched spring 57 then acts to return the fork to its lowered position.

The bale loading machine is thus fully automatic in its operation, picking up a bale as soon as the fork has been fully engaged with the bale, lifting the bale and depositing it in the body or bed of the vehicle to which the machine is hitched, and then returning the fork to its ground-engaging position for engagement with the next successive bale. Because of the position of the fork relative to the associated vehicle when the fork is in ground-engaging position, the driver of the associated vehicle has a full view of the fork and can maneuver the vehicle to engage the fork successively with bales scattered over the ground and one operator can thus load the bales from the ground into the bale carrying vehicle with no manual effort on the part of the operator other than driving the bale carrying vehicle or the tractor towing such vehicle.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A bale loading machine adapted to be pulled by and to load bales from the ground into an associated power propelled vehicle comprising a wheel supported axle, a frame mounted on said axle for rotation of said axle relative to said frame, a tongue extending forwardly from said frame and adapted to be connected at its front end to an associated vehicle near the front end of the latter, a cable drum journaled on said axle, a clutch effective to drivingly connect said axle to said cable drum, a clutch actuating lever pivotally mounted on said frame and effective to engage and disengage said clutch, a fork arm having a portion rotatably mounted on said clutch actuating lever and a portion extending outwardly and forwardly from said frame, a bale fork adjustably mounted on the forward end of said fork arm, said fork arm being effective to move said clutch actuating lever to its clutch engaging position upon engagement of said fork with a bale resting on the ground, a cable sheave disposed above said frame, means supporting said cable sheave from said frame, a cable wound at one end on said drum and connected at said other end to said fork arm adjacent said fork and carried over said cable sheave, said cable being effective when wound onto said cable drum to impart rotational movement to said fork arm and raise said fork to a predetermined position above said cable sheave, an abutment on said frame, and an angularly offset portion on the rear end of said fork arm effective to engage said abutment when said fork has been raised to said predetermined position and move said clutch actuating lever back to its clutch releasing position.

2. A bale loading machine adapted to be pulled by and to load bales from the ground into an associated power propelled vehicle comprising a wheel supported axle, a frame mounted on said axle for rotation of said axle relative to said frame, a tongue extending forwardly from said frame and adapted to be connected at its front end to an associated vehicle near the front end of the latter, a cable drum journaled on said axle, a clutch effective to drivingly connect said axle to said cable drum, a clutch actuating lever pivotally mounted on said frame and effective to engage and disengage said clutch, a fork arm having a portion rotatably mounted on said clutch actuating lever and a portion extending outwardly and forwardly from said frame, a bale fork adjustably mounted on the forward end of said fork arm, said fork arm being effective to move said clutch actuating lever to its clutch engaging position upon engagement of said fork with a bale resting on the ground, a cable sheave disposed above said frame, means supporting said cable sheave from said frame, a cable wound at one end on said drum and connected at said other end to said fork arm adjacent said fork and carried over said cable sheave, said cable being effective when wound onto said cable drum to impart rotational movement to said fork arm and raise said fork to a predetermined position above said cable sheave, an abutment on said frame, an angularly offset portion on the rear end of said fork arm effective to engage said abutment when said fork has been raised to said predetermined position and move said clutch actuating lever back to its clutch releasing position, a lever pivotally connected at one end to said frame at a location below said cable sheave and connected at its other end to said cable adjacent the connection between said cable and said fork arm, and a spring connected between said frame and said lever and placed under load when said fork is raised to said predetermined position to render it effective to initiate the descending movement of said fork when said clutch is released.

3. A bale loading machine adapted to be pulled by and to load bales from the ground into an associated power propelled vehicle comprising a wheel supported axle, a frame mounted on said axle for rotation of said axle relative to said frame, a tongue extending forwardly from said frame and adapted to be connected at its front end to an associated vehicle near the front end of the latter, a cable drum journaled on said axle, a clutch effective to drivingly connect said axle to said cable drum, a clutch actuating lever pivotally mounted on said frame and effective to engage and disengage said clutch, a fork arm having a portion rotatably mounted on said clutch actuating lever and a portion extending outwardly and forwardly from said frame, a bale fork adjustably mounted on the forward end of said fork arm, said fork arm being effective to move said clutch actuating lever to its clutch engaging position upon engagement of said fork with a bale resting on the ground, a cable sheave disposed above said frame, means supporting said cable sheave from said frame, a cable wound at one end on said drum and connected at said other end to said fork arm adjacent said fork and carried over said cable sheave, said cable being effective when wound onto said cable drum to impart rotational movement to said fork arm and raise said fork to a predetermined position above said cable sheave, an abutment on said frame, an angularly offset portion on the rear end of said fork arm effective to engage said abutment when said fork has been raised to said predetermined position and move said clutch actuating lever back to its clutch releasing position, and spring means connected between said cable and said frame and placed under load when said fork is raised to said predetermined position to render it effective to initiate the descending movement of said fork when said clutch is released.

References Cited in the file of this patent

UNITED STATES PATENTS

| Number | Name | Date |
|---|---|---|
| 980,038 | Wilson | Dec. 27, 1910 |
| 2,225,787 | McDermott et al. | Dec. 24, 1940 |